US007158016B2

(12) United States Patent
Cuddihy et al.

(10) Patent No.: US 7,158,016 B2
(45) Date of Patent: Jan. 2, 2007

(54) CRASH NOTIFICATION SYSTEM FOR AN AUTOMOTIVE VEHICLE

(75) Inventors: Mark A. Cuddihy, New Boston, MI (US); Gurpreet Aulakh, Brownstown Township, MI (US); James Helmke, Highland, MI (US); Frank Perry, Brownstown, MI (US); Judy Bridgeman, Detroit, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 0 days.

(21) Appl. No.: 10/711,368

(22) Filed: Sep. 14, 2004

(65) Prior Publication Data

US 2005/0040937 A1 Feb. 24, 2005

Related U.S. Application Data

(63) Continuation-in-part of application No. 10/064,281, filed on Jun. 28, 2002, now abandoned.

(51) Int. Cl.
*B60Q 1/00* (2006.01)

(52) U.S. Cl. .................... 340/436; 340/438; 340/539.1; 340/539.8; 340/988; 340/989; 701/45; 701/46; 701/47

(58) Field of Classification Search ................ 340/436, 340/438, 539.1, 539.8, 988, 989; 701/45, 701/46, 47
See application file for complete search history.

(56) References Cited

U.S. PATENT DOCUMENTS 5,914,675 A * 6/1999 Tognazzini ................. 340/989
5,969,598 A * 10/1999 Kimura ...................... 340/436
6,142,524 A * 11/2000 Brown et al. ............... 280/806
6,340,928 B1 1/2002 McCurdy
6,732,020 B1 * 5/2004 Yamagishi ..................... 701/1
2003/0112133 A1 * 6/2003 Webb et al. ................ 340/436

FOREIGN PATENT DOCUMENTS

| | | |
|---|---|---|
| EP | 0 847 906 | 6/1998 |
| EP | 1 094 429 | 4/2001 |
| GB | 2 300 996 | 11/1996 |
| JP | 08 0287386 | 11/1996 |
| JP | 2000-285437 | 10/2000 |

* cited by examiner

*Primary Examiner*—Tai Nguyen
(74) *Attorney, Agent, or Firm*—Jennifer M. Stec; Arte & Arte

(57) ABSTRACT

A crash notification system (12) for an automotive vehicle (10) is used to communicate with a communication network (22) and ultimately to a response center (24). The system (12) within vehicle (10) includes an occupant sensor (30) that generates an occupant sensor status signal. A crash sensor (34) a vehicle identification number memory (48), or a vertical acceleration sensor (46) may also be used to provide information to the controller (14). The controller (14) generates a communication signal that corresponds to the occupant sensor status signal and the other information so that appropriate emergency personnel may be deployed.

22 Claims, 2 Drawing Sheets

CRASH NOTIFICATION SYSTEM FOR AN AUTOMOTIVE VEHICLE

RELATED APPLICATIONS

The present application is a Continuation-In-Part of U.S. patent application Ser. No. 10/064,281, filed Jun. 28, 2002 is now abandoned, and incorporated herein by reference.

TECHNICAL FIELD

The present invention relates generally to crash sensing systems for automotive vehicles, and more particularly, to a crash notification system that notifies a response center to the severity and the number of occupants in the vehicle.

BACKGROUND OF THE INVENTION

Accident sensing systems typically use accelerometers to determine which safety devices to deploy. For example, a front accelerometer determines the deceleration of the vehicle. The restraints module deploys the front airbag in response to the deceleration being severe or above a predetermined amount. The deceleration corresponds to a crash impact on the front of the vehicle. Side airbag sensors operate in a similar manner in that a laterally mounted acceleration sensor measures the side deceleration on the vehicle due to a crash.

Telematics systems are currently offered by various automakers. Such systems typically contact a response center in response to the deployment of the airbags. The response center then notifies the police that some type of accident has occurred. Such a system, however, does not provide an indication to the severity of the crash.

U.S. Pat. No. 5,969,598 uses a telematics system to generate a signal corresponding to the severity of the crash. The system uses a shock sensor to determine the amount of shock after the airbag deployment. One problem with such a system is that an inadequate response may be provided if several passengers are within the vehicle. That is, too few emergency vehicles and personnel may be initially dispatched to the accident scene.

Therefore, it would be desirable to provide a crash notification system that provides an indication not only to the severity, but to the number of occupants of the vehicle so that adequate personnel may be dispatched to the scene.

SUMMARY OF THE INVENTION

The present invention provides a crash notification system that provides an indication as to the number of occupants of the vehicle. The crash notification system interfaces with a communication network. The crash notification system includes an occupant sensor that generates an occupant sensor status signal and a crash sensor generating a crash signal. A controller is coupled to the occupant sensor and a front and side crash sensor. The controller determines an angular direction of force from the front and side crash sensors. The controller generates a communication signal corresponding to the occupant sensor status signal and the crash status signal. Based upon the communication signal, a response center that is also coupled to the communication network may provide an appropriate response.

In a further aspect of the invention, a vehicle acceleration sensor may be coupled to the controller. The vertical acceleration may be used in addition to or in place of the front crash sensor and side crash sensors mentioned above. The vertical acceleration may be used to determine a horizontal orientation of the vehicle relative to the road. That is, the system allows the response center to know if the vehicle is lying on its side or roof or upright.

In another aspect of the invention, a vehicle identification number memory may be coupled to the controller. The vertical identification number memory may be in addition to or instead of the vertical acceleration sensor, the front crash sensor and the side crash sensors mentioned above. The vehicle identification number may be decoded to determine the profile of the vehicle such as but not limited to make, model and color. The above-mentioned front and side crash sensor, the vertical acceleration sensor and the vehicle identification number memory are used to provide more information to a response center and ultimately to a public service answering point from which help will be dispatched.

In a further aspect of the invention, a method for crash notification comprises generating an occupant sensor status signal; generating a crash signal; and generating a communication signal as a function of said occupant sensor status signal and said crash status signal; and coupling the communication signal to a communication network.

One advantage of the invention is that the severity level may be judged to merely send a tow truck upon a minor accident and can send the adequate number of emergency personnel should a more severe accident occur with several occupants.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

The following description is generated by way of example. Those skilled in the art will recognize various alternative embodiments and permutations of the present invention.

Figure 1:
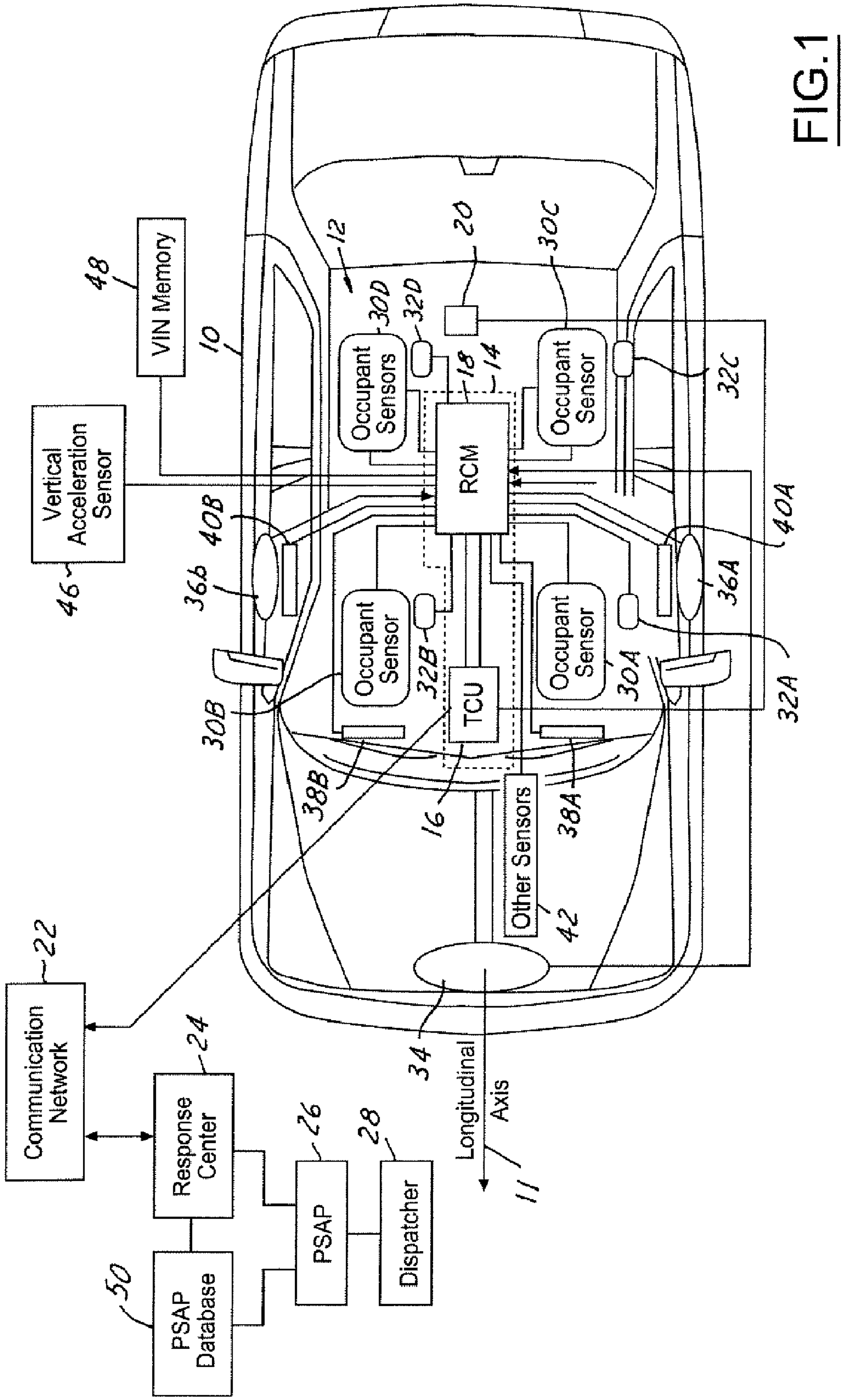
FIG. 1 is a block diagrammatic view of a crash notification system according to the present invention.

Referring now to FIG. 1, an automotive vehicle 10 is illustrated having a longitudinal axis 11 and a crash notification system 12 according to the present invention. Crash notification system 12 has a controller 14. Controller 14 is preferably microprocessor-based and has a memory, I/O ports, and a CPU. Controller 14 may be a central controller within the vehicle or may be a plurality of separate controllers that communicate. For example, controller 14 may have a telematics control unit 16 and a restraints control module 18. More modules may be used such as a separate module for the rear seat sensors.

Telematics control unit 16 is coupled to a global positioning system (GPS) antenna 20. GPS antenna 20 receives signals from location satellites so that telematics control unit 16 can determine the position of the vehicle 10. Telematics control unit 16 also generates communication signals to a communication network 22.

Communication network 22 may, for example, be a cellular phone network or a satellite communication network. Communication network 22 generates communication signals to a response center 24. Response center 24 may then contact a public service answering point (PSAP) 26 which in turn contacts a dispatcher so that the dispatcher 28 can dispatch appropriate emergency personnel or other assistance as will be further described below. The response center 24 may be provided by the telematics supplier. Communications may also be provided to the vehicle occupants from response center 24 through communication network 22. Thus, a two-way communication may be formed.

Restraints control module 18 is coupled to occupant sensors 30A, 30B, 30C, and 30D (collectively referred to as occupant sensors 30). Occupant sensors 30 may be one of a variety of types of occupant sensors including but not limited to a weight-based sensor, an infrared, ultrasonic, or other types of sensors that sense the presence of a person within a seating position of the vehicle. Preferably, an occupant sensor is provided for each seating position. Occupant sensor 30A is positioned at the driver's seat. Occupant sensor 30B is positioned at the passenger front seat. Occupant sensors 30C and 30D are illustrated in the rear position. Although only two rear occupant sensors 30C and 30D are illustrated, various numbers of rear occupant sensors may be employed depending on the type of vehicle. For example, three occupant sensors may be provided across the rear seat. Also, several rows of seating positions and thus several rows of occupant sensors may be provided in the seats of full-size vans, mini-vans, sport utility vehicles, and station wagons. The occupant sensors generate an occupant sensor status signal that corresponds to the presence of an occupant in the various seating positions.

Restraints control module 18 may also be coupled to a plurality of seat belt switches 32A, 32B, 32C, and 32D (collectively referred to as seat belt switch 32.) Seat belt switches 32 generate a seat belt status signal corresponding to the buckle or unbuckled state of the seat belts in the various positions. Preferably, each of the seating positions has a seat belt switch. As illustrated, seat belt switch 32A corresponds to the driver seat belt switch. Seat belt switch 32B corresponds to the front passenger seat, seat belt switches 32C and 32D correspond to the rear seat belt switches.

Restraints control module 18 is also coupled to a front crash sensor 34 and side crash sensors 36A and 36B. Both front crash sensor and side crash sensors 36A and 36B are preferably accelerometer-based. The crash sensors thus generate a crash signal corresponding to a crash in the particular part of the vehicle in which the sensors are located. In response to a severe crash signal, front airbags 38A and/or 38B may be deployed. Likewise, when a severe side crash signal is generated from side sensors 36A and/or 36B, side airbags 40A and/or 40B may be deployed. In a vector type analysis, the angular direction of force of the impact may be determined using the front and side crash sensors. The angular direction may, for example, be determined from an axis of the vehicle such as the longitudinal axis 11.

A vertical acceleration sensor 46 may also be coupled to controller 14. Vertical acceleration sensor generates a vertical acceleration signal corresponding to the vertical acceleration of the vehicle body. By monitoring the vertical acceleration, the horizontal orientation of the vehicle may be determined. That is, the horizontal orientation of the vehicle refers to the orientation of the vehicle body relative to the road. For example, the vehicle may be upright on its wheels, sideways, or upside down on its roof. The amount of response needed for a particular accident may be varied depending on the horizontal orientation of the vehicle relative to the road.

A vehicle identification number (VIN) memory 48 is coupled to controller 14. VIN memory may be used to provide the vehicle identification number to a response center. The response center may then decode the vehicle identification number. The vehicle identification number is a coded number, which provides various vehicle information including the make, model and color of the vehicle. The vehicle identification number may be decoded at various locations including the response center 24 and the public service answering point 26.

Based on the above-mentioned information the controller 14 may generate a communication signal to communication network 22. In various embodiments the communication signal may include some or all of the above information such as the occupant sensor status signal, the crash status signal, the VIN, the vertical acceleration or the horizontal orientation of the vehicle, or the direction of force of the crash. As well, the seat belt status signal may also be used to form the communication signal. In response to the communication signal, the response center 24 may be used to deploy the appropriate emergency level response.

Other sensors 42 may also be used by controller 14. For example, other sensors 42 may include the speed of impact, various accelerations, and the like. The direction of impact may also be determined but may be based on the input from crash sensors 34, 36A, and 36B.

The response center 24 and the public service answering point 26 may be coupled to a public service answering point database 50. The response center 24 may look up the appropriate public service answering point in the public service answering point database 50 in response to the position or location of the vehicle. That is, in response to the global positioning information provided by the vehicle, the nearest public service answering point may be determined. This will allow a "native" call to be placed to the public service answering point. The public service answering point 26 may be used to update the public service answering point database 50. A native call is contrasted with a non-native call. Non-native calls are made by non-residents and cellular phone calls. Non-native calls are given a lower priority. Native calls provide a priority connection to the nearest emergency response team. Native calls are given priority just as residential 911 calls are given.

Figure 2:
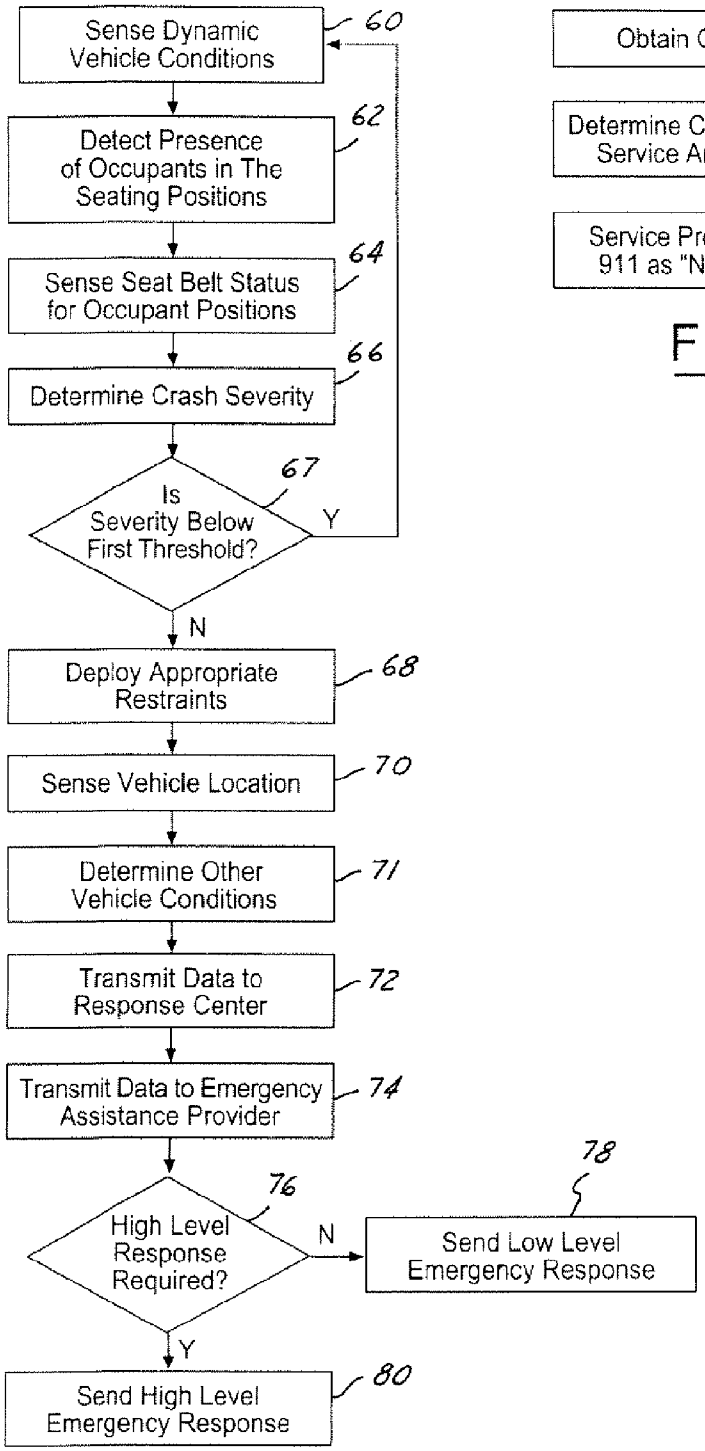
FIG. 2 is a flow chart illustrating a method for operating the crash notification system of the present invention.

Referring now to FIG. 2, the method for operating the crash notification system is described. In step 60, the various dynamic vehicle conditions are sensed. These may include the vehicle speed and the accelerations (decelerations) in the various directions provided by the crash sensors. The presence of the occupants in the different positions is determined in step 62. In step 64 the seat belt status for the occupant positions is also determined by monitoring the seat belt switches 32. The crash severity may be determined in step 66. When the crash is a minor crash and thus below a first threshold in step 67, the system recycles to block 60. No emergency response is needed in this situation. In step 67 if the severity is not below a first threshold, step 68 is executed. Appropriate restraints may be deployed in step 68 in response to the crash severity.

Once a crash has occurred, the vehicle location may be sensed in step 70. The vehicle may constantly monitor vehicle locations such as before step 67 but this information is not needed until after a crash. In step 71, various other vehicle conditions may be determined. For example, the vertical acceleration signal from the vertical acceleration may be used to obtain the horizontal orientation of the vehicle relative to the road surface. The vehicle identification number may also be obtained from the vehicle identification number memory 48 described above. The angular direction of the force applied to the vehicle may also be determined using the front crash sensor and/or side crash sensors. In step 72 the data from steps 60–71 may be transmitted to a response center through the communication network. For example, the occupant status signal, the crash signals from one or more of the crash sensors may be used to form the communication signal. In addition, the seat belt status signal may also be included in forming the seat belt status signal. Preferably, the seat belt status signals and the occupant status signals from the front and rear seating positions are used in the formation of the communication word. Further, the horizontal orientation of the vehicle, the VIN, the vertical acceleration and the angular direction of the force applied to the vehicle may all be used together or individually in the communication word.

In step 74, the response center transmits the data to an emergency service provider. The emergency service provider determines what type of emergency response personnel to send based on the communication signal and the data therein. If the crash is not above a second threshold or not severe in step 76 then the crash requires a low level emergency response. For example, a tow truck or repair vehicle may be automatically dispatched to the accident scene based on the GPS information in step 78.

In step 76 when the severity is above a second threshold, a high level emergency response is deployed. In step 80, a high level emergency response corresponding to the number of potentially injured occupants may be deployed. In addition, the communication signal may include the number of occupants in the vehicle and the number of occupants that were belted using the seat belt status sensor. This information may be included in each transmission regardless of whether they are used. The acceleration of the front and side airbags may also be used to determine the severity of the crash.

It should also be noted the severity signal may be generated at the vehicle and included in the communication signal.

As can be seen, the present invention filters out nuisance emergency dispatches through the telematics control unit by establishing various thresholds of severity. Advantageously, the appropriate level of response corresponding to the number of occupants may thus be deployed.

Figure 3:
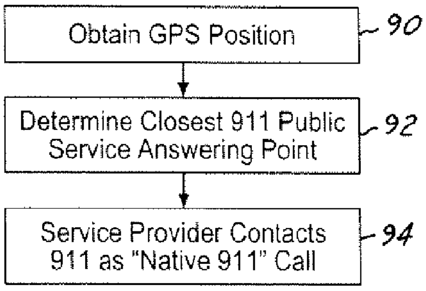
FIG. 3 is a flow chart illustrating in further detail step 72 of FIG. 2.

Referring now to FIG. 3, the transmission of data to response center in step 72 is further described. In step 90, the global positioning system may be used to obtain the position of the vehicle relative to the earth. In step 92, the closest public service answering point is determined. This may be performed at the response center 24 described above by interfacing to the public service answering point database 50. In step 94, the service provider is contacted, which generates a native 911 call to the public service answering point. As mentioned above, a native call allows the call to have priority over non-native calls such as from cellular phones or the like. When the answering point is contacted by the response center, the information within the communication signal may be automatically provided thereto. For example, a display at the public service answering point may automatically display the various information contained within the communication signal so that the appropriate response may be provided by emergency personnel. For example, if the vehicle has rolled over onto its roof as determined by the vertical acceleration sensor, special equipment to enter the vehicle may be required.

It should also be noted that various medical information may be provided from the response center to the public service answering point. The information may be provided voluntarily by the potential occupants of the vehicle. For example, various potential occupants may provide information such as allergies to certain medications. Such a system may also be set up electronically wherein a doctor's file may be automatically transmitted to the public service answering point.

While particular embodiments of the invention have been shown and described, numerous variations and alternate embodiments will occur to those skilled in the art. Accordingly, it is intended that the invention be limited only in terms of the appended claims.

What is claimed is:

1. A crash notification system coupled to a communication network having a response center comprising:

an occupant sensor generating an occupant sensor status signal;

a front crash sensor generating a front crash signal;

a side crash sensor generating a side crash signal; and a controller coupled to the occupant sensor and the front crash sensor and the side crash sensor, said controller determining an angular direction of force from the front crash signal and the side crash signal, said controller generating a communication signal that is communicated to the response center through the communication network, said communication signal corresponding to said occupant sensor status signal and the angular direction of force.

2. A crash notification system as recited in claim 1 wherein said occupant sensor comprises a front seat occupant sensor.

3. A crash notification system as recited in claim 1 wherein said occupant sensor comprises a rear seat occupant sensor.

4. A crash notification system as recited in claim 1 wherein said occupant sensor comprises a front seat occupant sensor and a rear seat occupant sensor.

5. A crash notification system as recited in claim 1 further comprising a seat belt switch generating a seat belt status signal, said controller generating a communication signal corresponding to said occupant sensor status signal, said angular direction of force and said seat belt status signal.

6. A crash notification system as recited in claim 5 wherein said seat belt switch comprises a front seat belt switch generating a front seat belt status signal.

7. A crash notification system as recited in claim 5 wherein said seat belt switch comprises a rear seat belt switch generating a rear seat belt status signal.

8. A crash notification system as recited in claim 1 wherein said seat belt switch comprises a front seat belt switch generating a front seat belt status signal and a rear seat belt switch generating a rear seat belt status signal, said controller generating a communication signal corresponding to said occupant sensor status signal, said rear seat belt status signal, said front seat belt status signal and said crash status signal.

9. A crash notification system as recited in claim 1 further comprising a vertical acceleration sensor generating a vertical acceleration signal, wherein said controller generates said communication signal corresponding to said occupant sensor status signal, the vertical acceleration sensor and the angular direction of force.

10. A crash notification system as recited in claim 1 further comprising a vehicle identification number memory having a vehicle identification number stored therein, said communication signal corresponding to said occupant sensor status signal, said vehicle identification number and the angular direction of force.

11. A crash notification system for a vehicle, said system coupled to a communication network having a response center comprising:

an occupant sensor generating an occupant sensor status signal;

a vertical acceleration sensor generating a vertical acceleration signal; and a controller coupled to the occupant sensor and the vertical acceleration sensor, said controller determining a horizontal orientation of the vehicle relative to a road from the vertical acceleration sensor, said controller generating a communication signal that is communicated to the response center through the communication network, said communication signal corresponding to said occupant sensor status signal and the horizontal orientation.

12. A crash notification system as recited in claim 11 further comprising a vehicle identification number memory having a vehicle identification number stored therein, said communication signal corresponding to said occupant sensor status signal, said vertical acceleration, said vehicle identification number and the angular direction of force.

13. A crash notification system as recited in claim 11 further comprising a crash sensor coupled to said controller, said crash sensor comprises a front crash sensor generating a front crash signal, a side crash sensor generating a side crash signal or both.

14. A crash notification system as recited in claim 11 wherein said occupant sensor comprises a front seat occupant sensor, a rear seat occupant sensor, or both.

15. A crash notification system as recited in claim 11 further comprising a seat belt switch generating a seat belt status signal, said controller generating a communication signal corresponding to said occupant sensor status signal, said horizontal orientation and said seat belt status signal.

16. A crash notification system as recited in claim 15 wherein said seat belt switch comprises a front seat belt switch generating a front seat belt status signal or a rear seat belt switch generating a rear seat belt status signal, or both.

17. A crash notification system as recited in claim 11 wherein said seat belt switch comprises a front seat belt switch generating a front seat belt status signal and a rear seat belt switch generating a rear seat belt status signal, said controller generating a communication signal corresponding to said occupant sensor status signal, said rear seat belt status signal, said front seat belt status signal and said horizontal orientation.

18. A method of operating a crash notification system comprising:

generating a occupant sensor status signal;

generating a crash signal;

generating a vehicle position signal;

generating a communication signal as a function of said occupant sensor status signal, crash status signal and the vehicle position signal;

transmitting the communication signal to a response center through the communication network;

at the response center, determining the nearest public service answering point in response to the vehicle position; and contacting the public service answering point as a native caller.

19. A method as recited in claim 18 further comprising coupling the communication signal to the public service answering point and displaying the crash status and the occupant sensor status.

20. A method as recited in claim 18 wherein generating a crash signal comprises a front crash signal and a side crash signal; and, further comprising, determining an angular direction of force from the front crash signal and the side crash signal.

21. A method as recited in claim 18 further comprising determining a vertical acceleration signal; determining a vertical acceleration and wherein generating a communication signal comprises generating the communication signal as a function of said occupant sensor status signal, crash status signal, the vehicle position signal and the horizontal orientation of the vehicle.

22. A method as recited in claim 18 further comprising transmitting a vehicle identification number to the response center; and decoding the vehicle identification number into vehicle information; and providing the vehicle information to the public service answering point.

* * * * *